United States Patent
Jiang et al.

(10) Patent No.: US 11,841,426 B2
(45) Date of Patent: Dec. 12, 2023

(54) THREE-DIMENSIONAL (3D) TERRAIN RECONSTRUCTION METHOD FOR SCOURED AREA AROUND BRIDGE PIER FOUNDATION BASED ON MECHANICAL SCANNED IMAGING SONAR

(71) Applicant: Fuzhou University, Fuzhou (CN)

(72) Inventors: Shaofei Jiang, Fuzhou (CN); Sheng Shen, Fuzhou (CN); Jianteng Chen, Fuzhou (CN); Zheng Cao, Fuzhou (CN); Mingxian Li, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 116 days.

(21) Appl. No.: 17/700,293

(22) Filed: Mar. 21, 2022

(65) Prior Publication Data
US 2023/0014144 A1    Jan. 19, 2023

(30) Foreign Application Priority Data
Jul. 19, 2021 (CN) .......................... 202110813425.4

(51) Int. Cl.
G01S 15/89 (2006.01)
G01S 7/40 (2006.01)
G06T 17/20 (2006.01)

(52) U.S. Cl.
CPC .......... *G01S 15/8993* (2013.01); *G01S 7/403* (2021.05); *G06T 17/20* (2013.01); *G06T 2207/10028* (2013.01); *G06T 2215/16* (2013.01)

(58) Field of Classification Search
CPC . G01S 15/89; G01S 7/40; G06T 17/20; G06T 15/10; G06T 15/00; G06T 19/00; G06T 17/00; G06T 17/10; G06T 17/005
See application file for complete search history.

(56) References Cited

U.S. PATENT DOCUMENTS

2023/0014144 A1* 1/2023 Jiang ....................... G01S 15/89

* cited by examiner

*Primary Examiner* — Todd Buttram
(74) *Attorney, Agent, or Firm* — MARSHALL, GERSTEIN & BORUN LLP

(57) ABSTRACT

A three-dimensional (3D) terrain reconstruction method for a scoured area around bridge pier foundation based on a mechanical scanned imaging sonar includes scanning an overall terrain of a scoured area around bridge pier foundation with a sonar from different azimuths to acquire n sonar images of a foundation scouring terrain; intercepting multiple analysis sections from each of acquired sonar images at a same distance; extracting key parameters of upper and lower edges on a terrain imaging strip in each of the analysis sections in the image, and transforming extracted parameters to a 3D space, a fan-shaped beam surface of the sonar being represented with a fan-shaped arc; recognizing a scour terrain profile in the analysis section; recognizing terrain profiles one by one, and respectively extracting spatially scattered 3D coordinate data; and performing interpolation and fitting on the spatially scattered data, thus implementing 3D reconstruction for the foundation scouring terrain.

4 Claims, 4 Drawing Sheets

THREE-DIMENSIONAL (3D) TERRAIN RECONSTRUCTION METHOD FOR SCOURED AREA AROUND BRIDGE PIER FOUNDATION BASED ON MECHANICAL SCANNED IMAGING SONAR

CROSS REFERENCE TO RELATED APPLICATION

This patent application claims the benefit and priority of Chinese Patent Application No. 202110813425.4, filed on Jul. 19, 2021, the disclosure of which is incorporated by reference herein in its entirety as part of the present application.

TECHNICAL FIELD

The present disclosure relates to the technical field of detection on underwater scouring terrains around bridge pier foundation, and in particular, to a three-dimensional (3D) terrain reconstruction method for a scoured area around bridge pier foundation based on a mechanical scanned imaging sonar.

BACKGROUND ART

Bridge pier foundations in complicated water movements for a long time are faced with constant riverbed undercutting, ever-decreasing embedded depths, and local scour. Especially in the flood period, old bridges scoured locally for a long time will have serious potential safety hazards, and tend to be overturned in the intense scouring of the floods. Hence, regular detection on scouring of the bridge pier foundations can provide information and supports for safety evaluation on structural states of bridges, prevention and treatment of riverbeds in local scour, etc.

Conventional scouring detection devices for bridge foundation are limited by the high installation cost and maintenance cost, high failure rate in the floods due to accidental impact by floating debris, and low detection efficiency due to discrete measured data. With better ease of installation than the conventional detection devices, sonar devices can acquire multiple scouring depths at a high detection efficiency in single scanning and imaging on the foundation scouring terrain. Meanwhile, the profiles of the scouring terrain from different azimuths of the bridge pier can be detected theoretically by moving the sonar around the pier. However, the practical acquired sonar images merely indicate a terrain scouring profile of the beam coverage area roughly, and hardly restore the overall scouring terrains around the bridge pier foundations precisely.

Therefore, it is desirable to provide a 3D terrain reconstruction method for a scoured area around bridge pier foundation based on a mechanical scanned imaging sonar.

SUMMARY

The present disclosure provides a 3D terrain reconstruction method for a scour around bridge pier foundation based on a mechanical scanned imaging sonar. The present disclosure can restore the 3D numerical scour model.

The present disclosure uses the following technical solutions.

A 3D terrain reconstruction method for a scour around bridge pier foundation based on a mechanical scanned imaging sonar includes the following steps:

step S1: scanning an overall terrain of a scoured area around bridge pier foundation with a mechanical scanning sonar device from different azimuths to acquire n sonar images of a scoured terrain in the different azimuths;

step S2: intercepting multiple analysis sections from each of acquired sonar images at a same distance;

step S3: extracting key parameters of upper and lower edges on a terrain imaging strip in each of the analysis sections in the image, and transforming extracted parameters to a 3D space according to an acoustic imaging principle, a fan-shaped beam surface of the sonar being represented with a fan-shaped arc;

step S4: recognizing, according to a relative positional relationship of fan-shaped arcs for a group of measuring points in a same analysis section, a scour terrain profile in the analysis section;

step S5: recognizing terrain profiles in different azimuths and different analysis sections one by one, and respectively extracting 3D coordinates of key points on each of profile curves to obtain required spatially scattered 3D coordinate data; and step S6: performing interpolation and fitting on the spatially scattered data with a Kriging interpolation method, thus implementing 3D reconstruction for the scouring terrain around bridge pier foundation.

The extracting key parameters of upper and lower edges on a terrain imaging strip in each of the analysis sections in the sonar image, and transforming extracted parameters to a 3D space according to an acoustic imaging principle in step S3 may specifically include:

step 3a: labeling, in an analysis section $p_{j,m}{}^i$ at a distance $d_j{}^i$ away from a sonar center, upper and lower edge points M, N on an imaging strip, ranges $r_{jk}{}^i$, $R_{jk}{}^i$ from an original sonar center point $P_{jk}{}^i$ to the upper and lower edge points M, N, and a large opening angle $\theta$ of the fan-shaped beam surface;

step 3b: drawing a circular arc with the upper edge point M as a center and the $r_{jk}{}^i$ as a radius, an intersection with the analysis section $p_{j,m}{}^i$ being an equivalent sonar center point $Q_{jk}{}^i$, and the equivalent sonar center point $Q_{jk}{}^i$ being $T_{jk}{}^i$ higher than a plane where the original sonar center is located; drawing a fan-shaped arc with the equivalent sonar center point $Q_{jk}{}^i$ that is $T_{jk}{}^i$ higher than the plane where the sonar is located as a center, the $r_{jk}{}^i$ as a radius, and the large opening angle $\theta$ of the fan-shaped beam surface to obtain a corresponding fan-shaped arc $A_{jk}{}^i B_{jk}{}^i$ of the upper edge point M in the 3D space; drawing a circular arc with the lower edge point N as a center and the $R_{jk}{}^i$ as a radius, an intersection with the analysis section $p_{j,m}{}^i$ being an equivalent sonar center point $K_{jk}{}^i$ that is $t_{jk}{}^i$ higher than the plane where the original sonar center is located; and drawing a fan-shaped arc with the $K_{jk}{}^i$ as a center, the $R_{jk}{}^i$ as a radius and the angle $\theta$ to obtain a corresponding fan-shaped arc $C_{jk}{}^i D_{jk}{}^i$ of the lower edge point N in the 3D space, where the superscript i represents a pier No., the first subscript j represents an azimuth in which a group of measuring points are located relative to a bridge pier, the second subscript k represents a specific measuring point in the group of measuring points, and k is 0, 1 and 2 representing left, middle and right measuring points in the group of measuring points; and step 3c: applying the same parameter transformation method to another two measuring points in the group of measuring points, to obtain a relative positional relationship in the 3D space for fan-shaped arcs corresponding to images for the group of measuring points in the same analysis section.

The recognizing, according to a relative positional relationship of fan-shaped arcs corresponding to a group of measuring points and obtained by parameter transformation in a same analysis section, a terrain profile in the scoured area in step S4 may specifically include:

step 4a: determining whether a terrain type belongs to a depressed terrain, a raised terrain, a continuous terrain, or an uncertain terrain according to a relative positional relationship for a group of fan-shaped arcs, where in case of the uncertain terrain, the terrain type is further determined in combination with a terrain profile curve determined in an adjacent azimuth;

step 4b: screening key points for forming a terrain profile curve according to following conditions: 1) the terrain type belongs to the depressed terrain, the raised terrain or the continuous terrain; 2) a fitted terrain profile curve is located between two fan-shaped arcs, and an intersected portion between adjacent fan-shaped surface is an area through which the terrain profile curve passes inevitably; and 3) upper and lower arcs restored by the measuring points each at least include a terrain profile point; and step 4c: determining key points of the terrain profile curve on each of the fan-shaped arcs while satisfying the above conditions, and connecting the key points through a smooth curve to obtain the terrain profile curve of a beam coverage area in the analysis section.

In step 4a, when distances from edge points on upper fan-shaped arcs of beams of auxiliary measuring points on two sides to the plane where the sonar is located are compared, an equation $L_{02} > l_{00} > l_{02}$ may be used if a greater distance is less than a distance from an edge point of a lower fan-shaped arc of an auxiliary measuring point on the other side; and concerning a connecting line $\alpha_{00}\alpha_{02}$ for mid-points on the upper fan-shaped arcs of the beams on the two sides, a mid-point $\alpha_{01}$ on an upper fan-shaped arc of a middle beam may be located below the connecting line $\alpha_{00}\alpha_{02}$, indicating that the terrain type is the depressed terrain.

In step S6, the interpolation and fitting may be performed on the massive spatially scattered data through the Kriging interpolation method, thus implementing 3D terrain reconstruction for the scoured area around bridge pier foundation, and obtaining a scouring contour map and a 3D visual map for the scour area around bridge pier foundation; and therefore, terrain information of the scour area may be intuitively viewed in the 3D space.

The present disclosure has the following beneficial effects: With the above solutions, the present disclosure can intuitively obtain the terrain information of the scoured area around the bridge pier through scanning and imaging of the sonar, and is convenient to directly view the scour in the 3D space.

BRIEF DESCRIPTION OF THE DRAWINGS

The present disclosure will be further described in detail below with reference to the accompanying drawings and specific implementations.

DETAILED DESCRIPTION OF THE EMBODIMENTS

Figure 1:
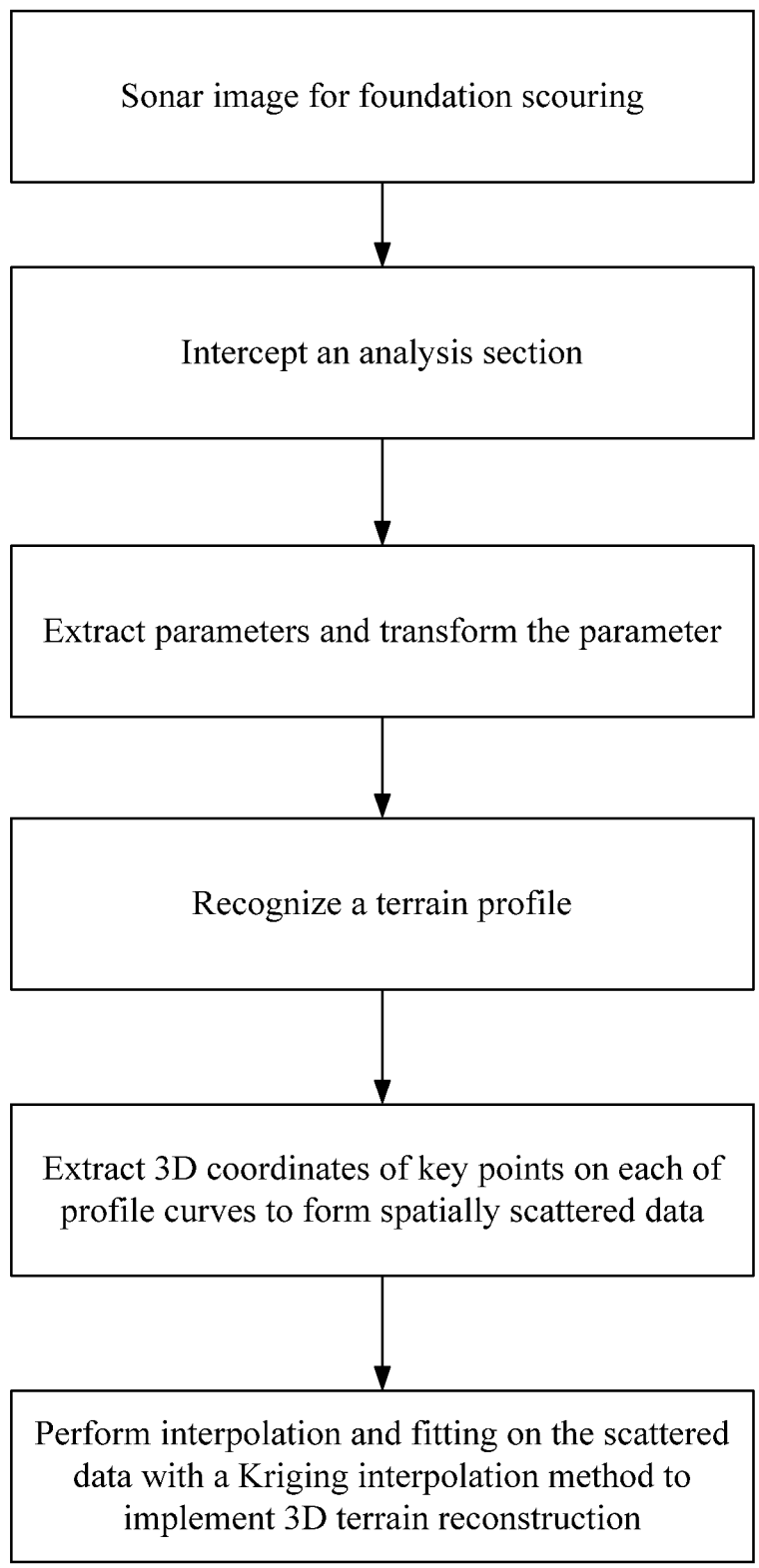
FIG. 1 is a schematic flowchart of the present disclosure.
Figure 2:
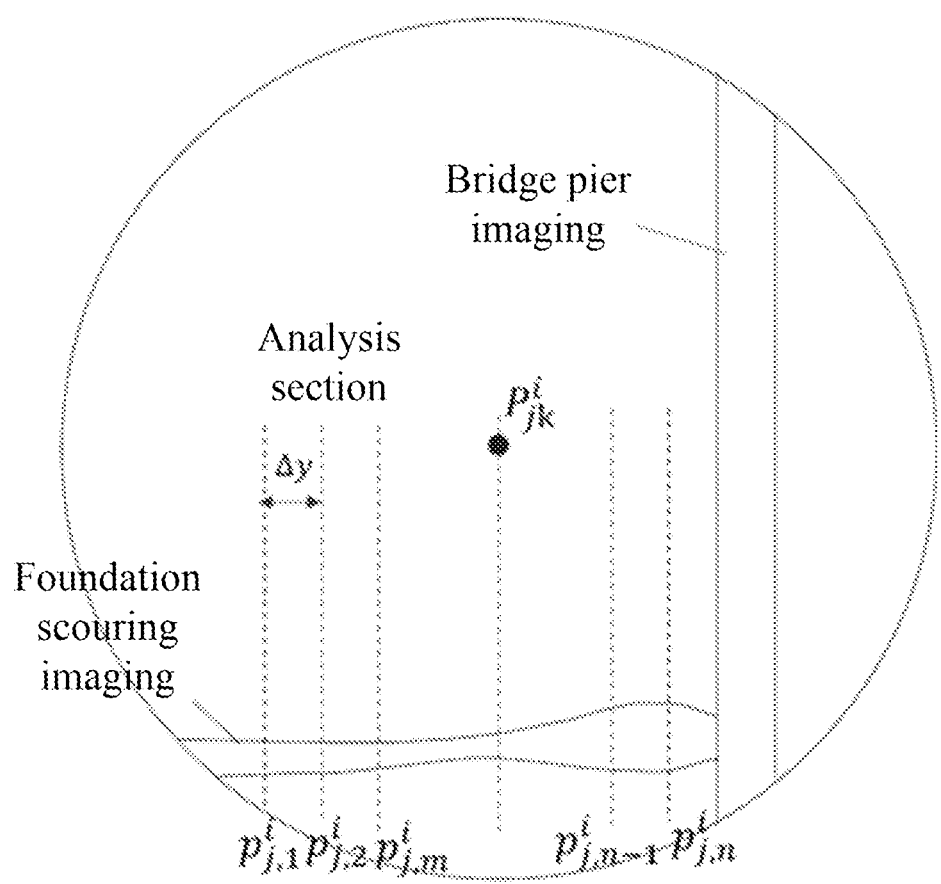
FIG. 2 is a schematic view for intercepting an analysis section of a sonar image of a scoured terrain around bridge pier foundation according to a method of the present disclosure.

As shown in figures, a 3D terrain reconstruction method for a scoured area around bridge pier foundation based on a mechanical scanned imaging sonar includes the following steps:

Step S1: Scan an overall terrain of a scoured area around bridge pier foundation with a mechanical scanning sonar from different azimuths to acquire n sonar images of the scoured terrain in the different azimuths.

Step S2: Intercept multiple analysis sections from each of acquired sonar images at a same distance.

Step S3: Extract key parameters of upper and lower edges on a terrain imaging strip in each of the analysis sections in the image, and transform extracted parameters to a 3D space according to an acoustic imaging principle, a fan-shaped beam surface of the sonar being represented with a fan-shaped arc.

Step S4: Recognize, according to a relative positional relationship of fan-shaped arcs for a group of measuring points in a same analysis section, a scouring terrain profile in the analysis section.

Step S5: Recognize terrain profiles in different azimuths and different analysis sections one by one, and respectively extract 3D coordinates of key points on each of profile curves to obtain required spatially scattered 3D coordinate data.

Step S6: Perform interpolation and fitting on the spatially scattered data with a Kriging interpolation method, thus implementing 3D reconstruction for the foundation scouring terrain.

The step of extracting key parameters of upper and lower edges on a terrain imaging strip in each of the analysis sections in the sonar image, and transforming extracted parameters to a 3D space according to an acoustic imaging principle in Step S3 specifically includes:

Step 3a: Label, in an analysis section $p_{j,m}{}^i$ at a distance $d_j{}^i$ away from a sonar center, upper and lower edge points M, N on an imaging strip, ranges $r_{jk}{}^i$, $R_{jk}{}^i$ from an original sonar center point $P_{jk}{}^i$ to the upper and lower edge points M, N, and a large opening angle θ of the fan-shaped beam surface, as shown in a of FIG. 3(b).

Step 3b: Draw a circular arc with the upper edge point M as a center and the $r_{jk}{}^i$ as a radius, an intersection with the analysis section $p_{j,m}{}^i$ being an equivalent sonar center point $Q_{jk}{}^i$, and the equivalent sonar center point $Q_{jk}{}^i$ being $T_{jk}{}^i$ higher than a plane where the original sonar center is located; draw a fan-shaped arc with the equivalent sonar center point $Q_{jk}{}^i$ that is $T_{jk}{}^i$ higher than the plane where the sonar is located as a center, the $r_{jk}{}^i$ as a radius, and the large opening angle θ of the fan-shaped beam surface to obtain a corresponding fan-shaped arc $A_{jk}{}^i$ $B_{jk}{}^i$ of the upper edge point M in the 3D space; draw a circular arc with the lower edge point N as a center and the $R_{jk}{}^i$ as a radius, an intersection with the analysis section $p_{j,m}{}^i$ being an equivalent sonar center point $K_{jk}{}^i$ that is $t_{jk}{}^i$ higher than the plane where the original sonar center is located; and draw a fan-shaped arc with the $K_{jk}{}^i$ as a center, the $R_{jk}{}^i$ as a radius and the angle θ to obtain a corresponding fan-shaped arc $C_{jk}^i$ $D_{jk}^i$ of the lower edge point N in the 3D space, where the superscript i represents a pier No., the first subscript j represents an azimuth in which a group of measuring points are located relative to a bridge pier, the second subscript k represents a specific measuring point in the group of measuring points, and k is 0, 1 and 2 representing left, middle and right measuring points in the group of measuring points.

Figure 3:
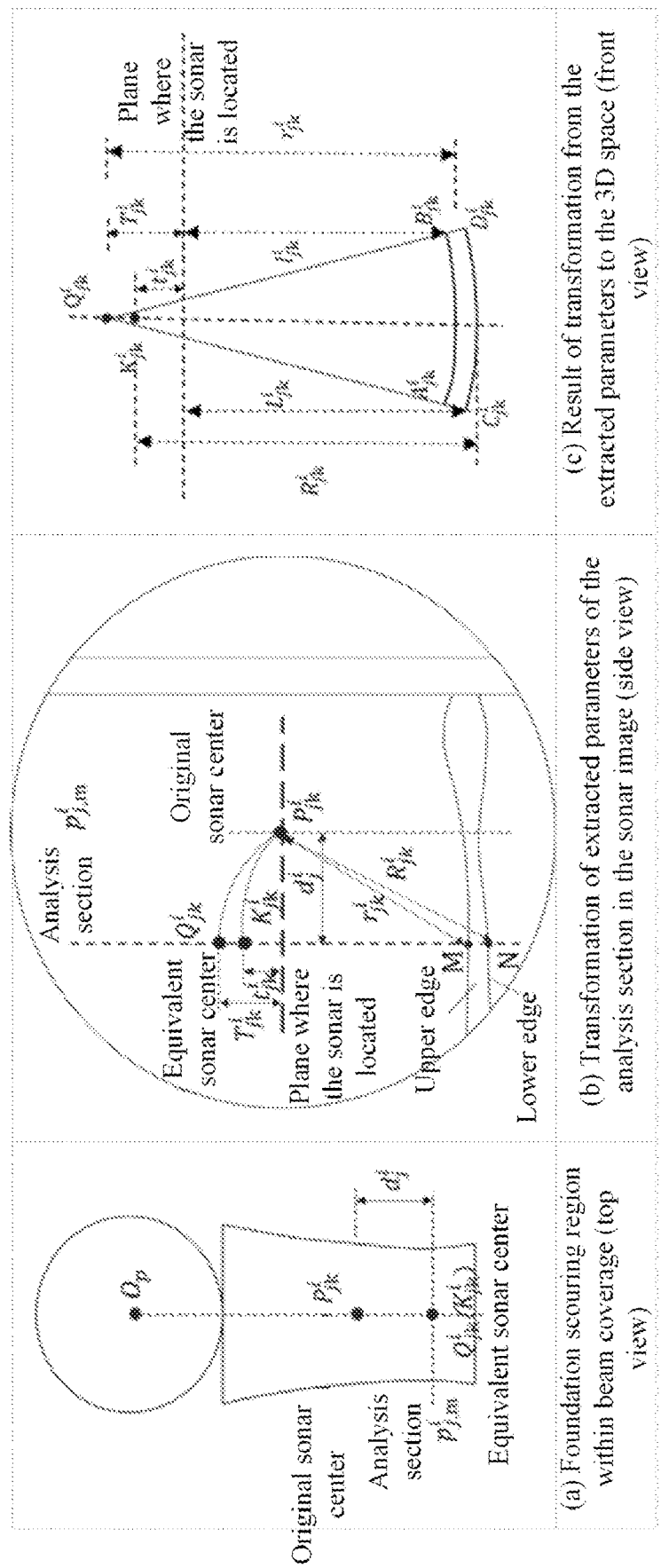
FIG. 3 is a schematic view for transforming extracted parameters of a sonar image to a 3D space according to a method of the present disclosure.

Step 3b is described with b and c in FIG. 3 as an example: Ranges from the original sonar center point $P_{jk}^i$ to the upper and lower edge points M, N of the analysis section are $r_{jk}^i$ and $R_{jk}^i$. A circular arc is drawn with the upper edge point M as a center and the $r_{jk}^i$ as a radius, an intersection with the analysis section $p_{j,m}^i$ being an equivalent sonar center point $Q_{jk}^i$, and the equivalent sonar center point $Q_{jk}^i$ being $T_{jk}^i$ higher than a plane where the original sonar center is located. A fan-shaped arc is drawn with the equivalent sonar center point $Q_{jk}^i$ that is $T_{jk}^i$ higher than the plane where the sonar is located as a center, the $r_{jk}^i$ as a radius, and the large opening angle θ of the fan-shaped beam surface to obtain a corresponding fan-shaped arc $A_{jk}^i$ $B_{jk}^i$ of the upper edge point M in FIG. 3 (c) in the 3D space. Likewise, a circular arc is drawn with the lower edge point N as a center and the $R_{jk}^i$ as a radius, an intersection with the analysis section $p_{j,m}^i$ being an equivalent sonar center point $K_{jk}^i$ that is $t_{jk}^i$ higher than the plane where the original sonar center is located. A fan-shaped arc with the $K_{jk}^i$ as a center, the $R_{jk}^i$ as a radius and the angle θ to obtain a corresponding fan-shaped arc $C_{jk}^i$ $D_{jk}^i$ of the lower edge point N in the 3D space. The superscript i represents a pile No., the first subscript j represents an azimuth in which a group of measuring points are located relative to a bridge pier, the second subscript k represents a specific measuring point in the group of measuring points, and k is 0, 1 and 2 representing left, middle and right measuring points in the group of measuring points.

Step 3c: Apply the same parameter transformation method to another two measuring points in the group of measuring points, to obtain a relative positional relationship in the 3D space for fan-shaped arcs corresponding to images for the group of measuring points in the same analysis section.

The step of recognizing, according to a relative positional relationship of fan-shaped arcs corresponding to a group of measuring points and obtained by parameter transformation in a same analysis section, a terrain profile in the scoured area in Step S4 specifically includes:

Step 4a: Determine whether a terrain type belongs to a depressed terrain, a raised terrain, a continuous terrain, or an uncertain terrain according to a relative positional relationship for a group of fan-shaped arcs, where in case of the uncertain terrain, the terrain type is further determined in combination with a terrain profile curve determined in an adjacent azimuth.

Step 4b: Screen key points for forming a terrain profile curve according to following conditions: 1) the terrain type belongs to the depressed terrain, the raised terrain or the continuous terrain; 2) a fitted terrain profile curve is located between two fan-shaped arcs, and an intersected portion between adjacent fan-shaped surfaces is an area through which the terrain profile curve passes inevitably; and 3) upper and lower arcs restored by the measuring points each at least include a terrain profile point.

Step 4c: Determine key points of a terrain profile curve on each of the fan-shaped arcs while satisfying the above conditions, and connecting the key points through a smooth curve to obtain the terrain profile curve of a beam coverage area in the analysis section.

As shown in FIG. 3, in Step 4a, when distances from edge points on upper fan-shaped arcs of beams of auxiliary measuring points on two sides to the plane where the sonar is located are compared, an equation $L_{02} > l_{00} > l_{02}$ is used if a greater distance is less than a distance from an edge point of a lower fan-shaped arc of an auxiliary measuring point on the other side; and concerning a connecting line $\alpha_{00}\alpha_{02}$ for mid-points on the upper fan-shaped arcs of the beams on the two sides, a mid-point $\alpha_{01}$ on an upper fan-shaped arc of a middle beam is located below the connecting line $\alpha_{00}\alpha_{02}$, indicating that the terrain type is the depressed terrain.

Figure 4:
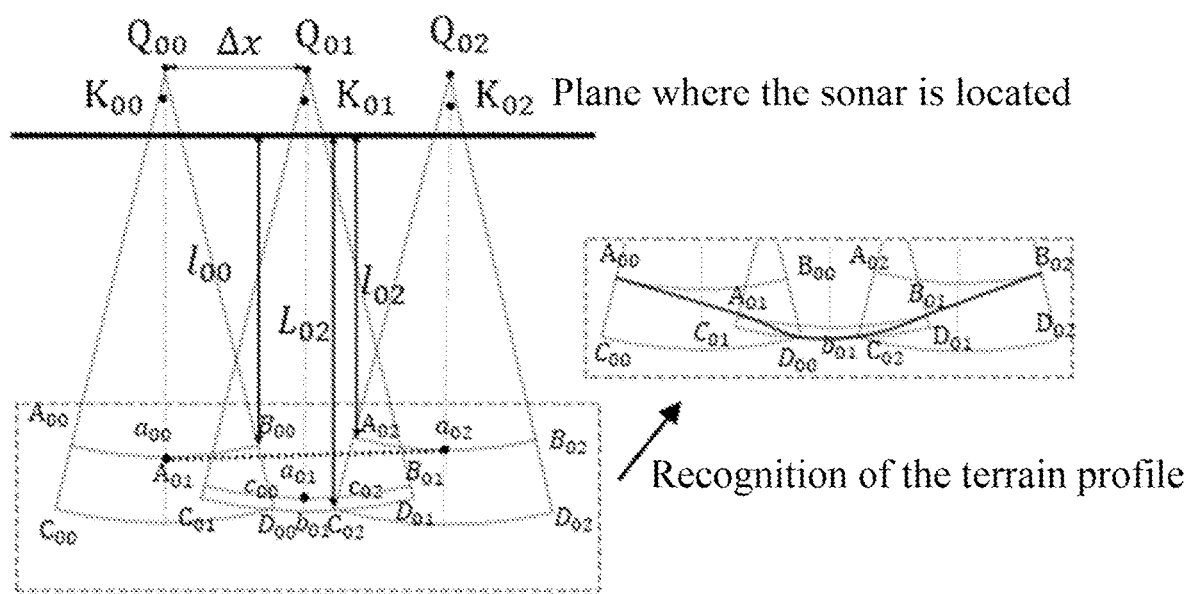
FIG. 4 is a schematic view for recognizing a depressed terrain profile according to a relative positional relationship of fan-shaped arcs for a group of measuring points according to a method of the present disclosure.

As shown in FIG. 4, when the terrain type is determined as the depressed terrain, the fitted terrain profile curve is located between two fan-shaped arcs, the intersected portions between adjacent fan-shaped arc surfaces (namely areas $A_{01}C_{01}D_{00}C_{00}$ and $c_{02}C_{02}D_{01}B_{01}$ in FIG. 4) are areas through which the terrain profile curve passes inevitably, and upper and lower fan-shaped arcs restored by the measuring points each at least include a terrain profile point.

In Step S6, the interpolation and fitting are performed on the massive spatially scattered data through the Kriging interpolation method, thus implementing 3D terrain reconstruction for the scoured area around bridge pier foundation, and obtaining a scour contour map and a 3D visual map of the scour; and therefore, terrain information of the scoured area around bridge pier foundation can be intuitively viewed in the 3D space.

The above are merely preferred specific implementations of the present disclosure. These specific implementations are different implementations based on overall concepts, rather than limitations to the protection scope of the present disclosure. The implementations are illustrated only for explaining functions and use methods of the present disclosure rather than limitations to the present disclosure. Various changes or replacements made by a person of ordinary skill in the art without departing from the substantial scope of the present disclosure fall into the protection scope of the present disclosure.

What is claimed is:

1. A three-dimensional (3D) terrain reconstruction method for a scoured area around bridge pier foundation based on a mechanical scanned imaging sonar, comprising the following steps:
   step S1: scanning an overall terrain of a scoured area around bridge pier foundation with a mechanical scanning sonar device from different azimuths to acquire n sonar images of a scoured terrain in the different azimuths;
   step S2: intercepting multiple analysis sections from each of acquired sonar images at a same distance;
   step S3: extracting key parameters of upper and lower edges on a terrain imaging strip in each of the analysis sections in the image, and transforming extracted parameters to a 3D space according to an acoustic imaging principle, a fan-shaped beam surface of the sonar being represented with a fan-shaped arc;
   step S4: recognizing, according to a relative positional relationship of fan-shaped arcs for a group of measuring points in a same analysis section, a scour terrain profile in the analysis section;
   step S5: recognizing terrain profiles in different azimuths and different analysis sections one by one, and respectively extracting 3D coordinates of key points on each of profile curves to obtain required spatially scattered 3D coordinate data; and
   step S6: performing interpolation and fitting on the spatially scattered data with a Kriging interpolation method, thus implementing 3D reconstruction for the foundation scouring terrain;

wherein the extracting key parameters of upper and lower edges on a terrain imaging strip in each of the analysis sections in the sonar image, and transforming extracted parameters to a 3D space according to an acoustic imaging principle in step S3 specifically comprises:

step 3a: labeling, in an analysis section $p^i_{j,m}$ at a distance $d^i_j$; away from a sonar center, upper and lower edge points M, N on an imaging strip, ranges $r^i_{jk}$, $R^i_{jk}$ from an original sonar center point $P^i_{jk}$ to the upper and lower edge points M, N, and a large opening angle $\Theta$ of the fan-shaped beam surface;

step 3b: drawing a circular arc with the upper edge point M as a center and the $r^i_{jk}$ as a radius, an intersection with the analysis section $p^i_{j,m}$ being an equivalent sonar center point $Q^i_{jk}$ and the equivalent sonar center point $Q^i_{jk}$ being $T^i_{jk}$ higher than a plane where the original sonar center is located; drawing a fan-shaped arc with the equivalent sonar center point $Q^i_{jk}$ that is $T^i_{jk}$ higher than the plane where the sonar is located as a center, the $r^i_{jk}$ as a radius, and the large opening angle $\Theta$ of the fan-shaped beam surface to obtain a corresponding fan-shaped arc $A^i_{jk} B^i_{jk}$ of the upper edge point M in the 3D space; drawing a circular arc with the lower edge point N as a center and $R^i_{jk}$ as a radius, an intersection with the analysis section $p^i_{j,m}$ being an equivalent sonar center point $K^i_{jk}$ that is $t^i_{jk}$ higher than the plane where the original sonar center is located; and drawing a fan-shaped arc with the $K^i_{jk}$ as a center, the $R^i_{jk}$ as a radius and the angle $\Theta$ to obtain a corresponding fan-shaped arc $C^i_{jk} D^i_{jk}$ of the lower edge point N in the 3D space, where the superscript i represents a pier No., the first subscript j represents an azimuth in which a group of measuring points are located relative to a bridge pier, the second subscript k represents a specific measuring point in the group of measuring points, and k is 0, 1 and 2 representing left, middle and right measuring points in the group of measuring points; and step 3c: applying the same parameter transformation method to another two measuring points in the group of measuring points, to obtain a relative positional relationship in the 3D space for fan-shaped arcs corresponding to images for the group of measuring points in the same analysis section.

2. The 3D terrain reconstruction method for a scoured area around bridge pier foundation based on a mechanical scanned imaging sonar according to claim 1, wherein the recognizing, according to a relative positional relationship of fan-shaped arcs corresponding to a group of measuring points and obtained by parameter transformation in a same analysis section, a terrain profile in the scoured area in step S4 specifically comprises:

step 4a: determining whether a terrain type belongs to a depressed terrain, a raised terrain, a continuous terrain, or an uncertain terrain according to a relative positional relationship for a group of fan-shaped arcs, wherein in case of the uncertain terrain, the terrain type is further determined in combination with a terrain profile curve determined in an adjacent azimuth;

step 4b: screening key points for forming a terrain profile curve according to following conditions: 1) the terrain type belongs to the depressed terrain, the raised terrain or the continuous terrain; 2) a fitted terrain profile curve is located between two fan-shaped arcs, and an intersected portion between adjacent fan-shaped surface is an area through which the terrain profile curve passes inevitably; and 3) upper and lower arcs restored by the measuring points each at least comprise a terrain profile point; and step 4c: determining key points of the terrain profile curve on each of the fan-shaped arcs while satisfying the above conditions, and connecting the key points through a smooth curve to obtain the terrain profile curve of a beam coverage area in the analysis section.

3. The 3D terrain reconstruction method for a scoured area around bridge pier foundation based on a mechanical scanned imaging sonar according to claim 2, wherein in step 4a, when distances from edge points on upper fan-shaped arcs of beams of auxiliary measuring points on two sides to the plane where the sonar is located are compared, an equation $L_{02} > l_{00} > l_{02}$ is used if a greater distance is less than a distance from an edge point on a lower fan-shaped arc of an auxiliary measuring point on the other side; and concerning a connecting line $\alpha_{00}\alpha_{02}$ a for mid-points on the upper fan-shaped arcs of the beams on the two sides, a mid-point $\alpha_{01}$ on an upper fan-shaped arc of a middle beam is located below the connecting line $\alpha_{00}\alpha_{02}$, indicating that the terrain type is the depressed terrain.

4. The 3D terrain reconstruction method for a scoured area around bridge pier foundation based on a mechanical scanned imaging sonar according to claim 1, wherein in step S6, the interpolation and fitting are performed on the massive spatially scattered data through the Kriging interpolation method, thus implementing 3D terrain reconstruction for the bridge pier foundation scoured area, and obtaining a foundation scouring contour map and a 3D visual map; and therefore, terrain information of the bridge pier foundation scoured area is intuitively viewed in the 3D space.

* * * * *